No. 756,481. PATENTED APR. 5, 1904.
J. DUPUIS.
CHAIN.
APPLICATION FILED MAY 25, 1903.
(NO MODEL) 2 SHEETS—SHEET 1.
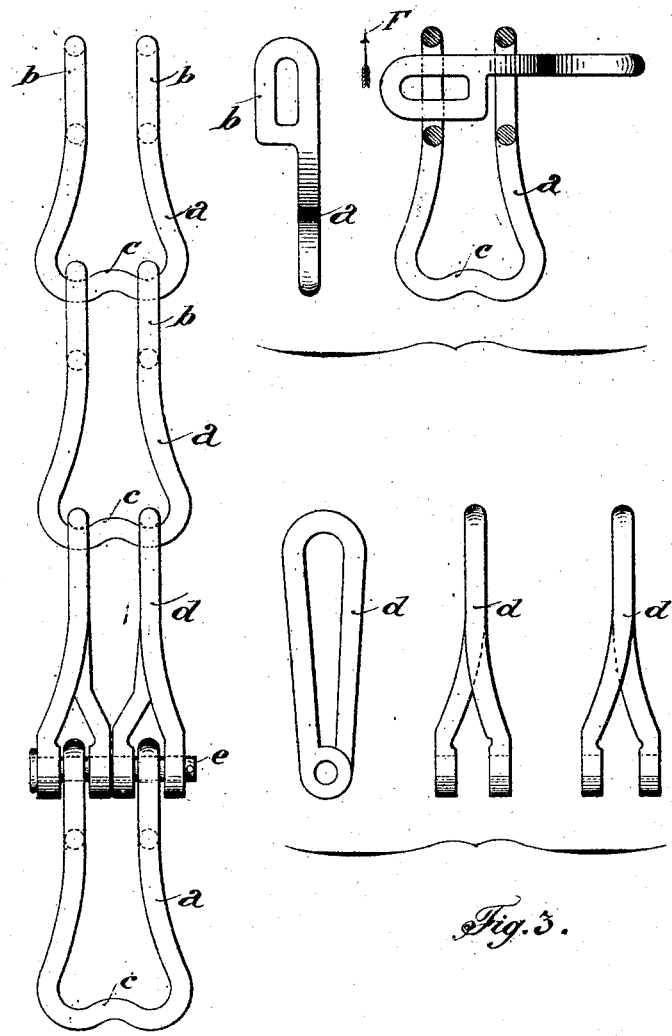

No. 756,481. PATENTED APR. 5, 1904.
J. DUPUIS.
CHAIN.
APPLICATION FILED MAY 25, 1903.
NO MODEL. 2 SHEETS—SHEET 2.
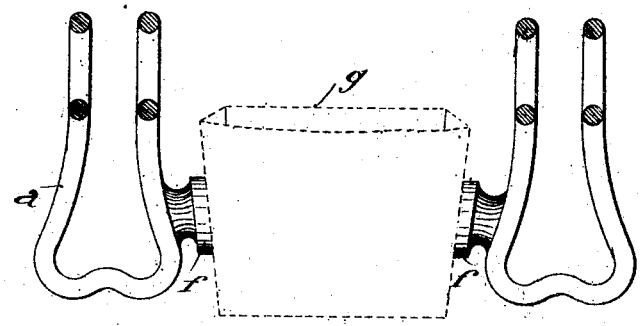
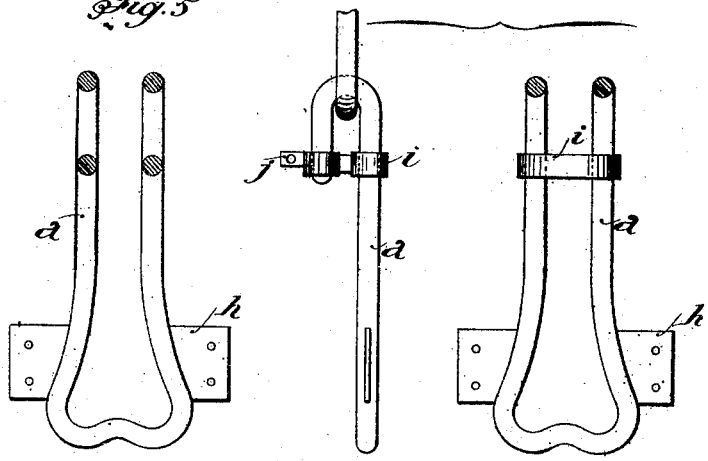
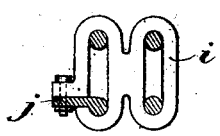
Witnesses.
Geo. Heinicke
Gaston Dittman
Inventor
Jean Dupuis
per G. Dittman
Attorney No. 756,481. Patented April 5, 1904.

UNITED STATES PATENT OFFICE.

JEAN DUPUIS, OF MONTPELLIER, FRANCE.

CHAIN.

SPECIFICATION forming part of Letters Patent No. 756,481, dated April 5, 1904.

Application filed May 25, 1903. Serial No. 158,719. (No model.)

*To all whom it may concern:*

Be it known that I, JEAN DUPUIS, a citizen of the French Republic, residing at Montpellier, France, have invented certain new and useful Improvements in Chains, of which the following is a specification.

This invention has for its object a novel construction of chain composed of links made by preference of cast-steel, these links having a special form and being able to be connected together in such a manner as to prevent them becoming detached under any circumstances when the chain is in use.

In the accompanying drawings, which represent different forms of manufacture of the said chain, Figure 1 shows a series of links with connection. Fig. 2 shows the arrangement of two links for joining. Fig. 3 shows the arrangement of connecting-links. Figs. 4, 5, 6, and 7 show different forms of links utilized in certain particular cases.

Each link $a$ takes in principle the form represented in Figs. 1, 2, and 3 and has a double loop $b$ at the opposite end of the widened part $c$ of the link, which is for the purpose of connection to the following link. In order to join the links together, they are arranged as shown in Fig. 2 by passing one of the loops of the second link through the two loops of the first link and pushing them to the bottom, then by turning the second link a quarter of a turn in the direction of the arrow F, and then a quarter of a turn in the direction of the arrow F'. The first two elements of the chain will then be in their normal connected position, and the successive links are connected in the same manner. Connection can be made by means of special links $d$, equally detachable, passing on a small axle-pin $e$.

In the arrangement represented in Fig. 4 each of the links $a$ carries a projecting foot $f$, serving, for instance, for the fixing of transport-buckets $g$. In this case the transport would be accomplished with two parallel chains composed of suitable link elements acting upon two pairs of pulleys with parallel axles in any usual manner.

In Figs. 5, 6, and 7 are shown links with flat double feet or plates $h$ for attachment to buckets. One of these links has a double arresting-ring $i$ encircling the parallel portions of the link and the depending arms of the bent-over portion, said ring having a lateral portion adapted to be secured by screw or otherwise to a lateral projection $j$ on the link. (See Fig. 7.)

The chain herein described can be used for numerous purposes, such as simple transmissions of movement, as well as for transporters, elevators, and the like by adopting the accessory arrangements above indicated.

Having now particularly described and ascertained the nature of the said invention and in what manner the same is to be performed, I declare that what I claim is—

1. A chain composed of links detachably connected together, each link having widened portion, and double parallel closed portions at the end farthest from said widened portion, with the loops of one link engaged with the widened portion of the next adjacent.

2. A chain composed of links, each link having double parallel portions at the end opposite the widened portion, the links having lateral projecting feet, and arresting-rings with lateral projections, as and for the purpose specified.

3. A chain composed of links detachably connected together, the links having lateral projections or feet near one end, and a lateral projection near the opposite end, and arresting-rings having lateral projections secured to the said lateral projections of the links, as set forth.

4. A link formed with widened portion at one end, and double parallel portions at the other end, an arresting-ring engaging said parallel portions and with laterally-projecting feet near the widened end for attachment to a bucket, as and for the purpose specified.

In testimony whereof I affix my signature.

JEAN DUPUIS.

In presence of—
PAUL P. ALRIC,
ALFRED V. RIVAFONCUER.